(12) United States Patent
Dunning et al.

(10) Patent No.: US 7,127,423 B2
(45) Date of Patent: Oct. 24, 2006

(54) SYSTEM AND METHOD FOR CREATING AND ADMINISTERING AN INVESTMENT INSTRUMENT

(75) Inventors: Doug Dunning, Apple Valley, MN (US); Ron Bristol, Hammond, WI (US); Georgann G. Burns, Minneapolis, MN (US); Pan Hall, Edina, MN (US); Douglas Hoover, Ham Lake, MN (US); Terry McEvoy, Roseville, MN (US); Bruce Kohn, Edina, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 561 days.

(21) Appl. No.: 09/940,509

(22) Filed: Aug. 27, 2001

(65) Prior Publication Data

US 2002/0059123 A1 May 16, 2002

Related U.S. Application Data

(60) Provisional application No. 60/228,366, filed on Aug. 28, 2000.

(51) Int. Cl.
*G06Q 40/00* (2006.01)
(52) U.S. Cl. .......................................... 705/36; 705/35
(58) Field of Classification Search ................ 705/35, 705/36
See application file for complete search history.

(56) References Cited

U.S. PATENT DOCUMENTS

| | | | |
|---|---|---|---|
| 4,742,457 A | 5/1988 | Leon et al. | |
| 4,944,532 A | 7/1990 | Pollard | |
| 4,953,085 A | 8/1990 | Atkins | |
| 4,997,188 A | 3/1991 | Nilssen | |
| 5,082,275 A | 1/1992 | Nilssen | |
| 5,083,782 A | 1/1992 | Nilssen | |
| 5,083,784 A | 1/1992 | Nilssen | |
| 5,126,936 A | 6/1992 | Champion et al. | |
| 5,513,102 A | 4/1996 | Auriemma | |
| 5,583,760 A | 12/1996 | Klesse | |
| 5,644,727 A | 7/1997 | Atkins | |
| 5,798,508 A | 8/1998 | Walker et al. | |
| 5,812,988 A * | 9/1998 | Sandretto .................... | 705/36 |
| 5,832,461 A | 11/1998 | Leon et al. | |
| 5,852,811 A | 12/1998 | Atkins | |
| 5,864,828 A | 1/1999 | Atkins | |
| 5,884,283 A | 3/1999 | Manos | |
| 5,884,285 A | 3/1999 | Atkins | |
| 5,911,135 A | 6/1999 | Atkins | |
| 5,911,136 A | 6/1999 | Atkins | |
| 5,946,667 A | 8/1999 | Tull, Jr. et al. | |
| 5,946,668 A | 8/1999 | George | |
| 5,991,736 A | 11/1999 | Ferguson et al. | |
| 6,016,483 A | 1/2000 | Rickard et al. | |

(Continued)

*Primary Examiner*—Alain L. Bashore
(74) *Attorney, Agent, or Firm*—Snell & Wilmer L.L.P.

(57) ABSTRACT

The present invention provides a system and method for creating and administering an investment instrument. More specifically, the present invention provides a system and method for creating and administering an investment instrument that may be cleared through a depository company, that has relatively short terms and/or that enables investors to participate in financial market activity while protecting their principal investments. In accordance with one embodiment of the invention, an investment instrument preserves an investor's principal and offers a choice of several models for generating return. Return-generating models may allow an investor to participate fully in market movement, participate partially in market movement with a guaranteed minimum return, or receive a fixed return without participating in market movement.

76 Claims, 3 Drawing Sheets

U.S. PATENT DOCUMENTS

| | | |
|---|---|---|
| 6,017,063 A | 1/2000 | Nilssen |
| 6,038,550 A | 3/2000 | Rosenwald |
| 6,049,782 A | 4/2000 | Gottesman et al. |
| 6,052,673 A | 4/2000 | Leon et al. |
| 6,058,371 A | 5/2000 | Djian |
| 6,070,153 A | 5/2000 | Simpson |
| 6,125,355 A | 9/2000 | Bekaert et al. |
| 6,148,293 A | 11/2000 | King |
| 6,164,533 A | 12/2000 | Barton |
| 6,208,978 B1 | 3/2001 | Walker et al. |
| 6,360,210 B1 * | 3/2002 | Wallman .............. 705/36 |
| 6,754,639 B1 * | 6/2004 | Ginsberg ............. 705/36 R |
| 2002/0019789 A1 * | 2/2002 | Ginsberg ............. 705/36 |

* cited by examiner

SYSTEM AND METHOD FOR CREATING AND ADMINISTERING AN INVESTMENT INSTRUMENT

CROSS-REFERENCE TO RELATED APPLICATIONS

Applicant hereby claims priority to, and the benefit of, U.S. Provisional Application No. 60/228,366, entitled "Equity Indexed Certificates" and filed Aug. 28, 2000, which application is hereby incorporated by reference into this application in its entirety.

BACKGROUND OF THE INVENTION

1. Field of the Invention

The invention disclosed herein relates generally to an investment instrument. More particularly, the present invention relates to a method for creating and administering an investment instrument which enables investors to choose between levels of participation in financial market activity while protecting their principal investments. The investment instrument may also have relatively short terms and/or may clear through a depository.

2. Description of the Prior Art

Existing investment instruments typically allow an individual to invest a given amount of principal and to earn either a fixed, guaranteed rate of return (or "interest") or a flexible rate of return that is not guaranteed. As described in further detail below, an "investment instrument" is any means by which an investor may invest principal. "Principal" refers to the amount of an investor's initial investment in an investment instrument, plus any interest earned, minus any payments or disbursements made to the investor from the investment instrument and any withdrawal penalties. Thus, principal is different from "face value," which is the amount an investment instrument is worth "on its face" and typically corresponds to the amount initially invested in the instrument—i.e., without added interest. For the purposes of this specification, "interest" and "return" are synonymous terms, meaning the amount earned by an investment instrument.

Typically, guaranteed investments offer lower potential returns and lower risk than flexible-rate investments. An example of a very low-risk, low-return investment is a Certificate of Deposit. A CD is a fixed income financial instrument, typically issued by a bank or similar financial institution, that guarantees a fixed return on investment. Though the rate of return on a CD may sometimes be set with a flexible interest rate, such as the federally set interest rate, there is still a guaranteed return on the investment. Furthermore, the principal invested in a CD is protected, so an investor will not lose principal even if market conditions become extremely unfavorable. When a CD matures at the end of its term, a customer may "roll over" the CD. To "roll over" a CD means to reinvest the original principal and, if desired, the earned interest, into a new CD for another term. One drawback of a CD is that funds invested in a CD do not participate in equity markets, which may potentially offer significantly higher returns than a CD.

At the opposite end of the risk/return spectrum, equities are high-risk investments with a potential for very high return. This class of investments typically takes the form of stock certificates, or "shares," issued by corporations. Each share represents an ownership interest in the corporation equal to the percentage of shares held. Stock certificates are traded on financial "markets," or "exchanges," throughout the world, such as the NASDAQ ("National Association of Securities Dealers Automatic Quotation"), the NYSE ("New York Stock Exchange"), and the French Cotation Assite Continue ("Quotes Assisted Live" or "CAC4O"). For the purposes of this specification, the terms "market" and "exchange" mean any financial, commodities, or any other relevant market known to those skilled in the art. As shares trade on exchanges, their values rise and fall in accordance with demand for the shares. Equity investors can achieve extraordinary returns on their investment if demand for their shares increases, but they also risk losing their entire principal if the company that issued the shares goes out of business, enters bankruptcy, or otherwise fails to create demand for their shares.

One variation on equity investments is the mutual fund. Mutual funds are collections of stocks, bonds, or other investments pooled within a common fund. Consumers buy shares in the fund, which is managed by an investment advisor. The manager decides how to invest the fund's assets. As the investments held by the fund generate income or generally rise in value, so does the value of the fund's shares. While it is possible to lose the principal investment, the risk of loss is spread across multiple equity investments and, thus, is typically less than the risk of investing in individual stocks. One drawback of a mutual fund is that each shareholder is responsible for fund fees and other charges incurred when the fund liquidates assets. While mutual funds typically have higher rates of return than CDs or other fixed interest investments, they seldom offer the potential for returns as high as those possible with individual stocks. Furthermore, though investing in mutual funds is typically less risky than buying individual stocks, it is still possible to lose principal.

Thus, a need exists for an investment instrument that allows investors to choose a level of participation in the activity of financial markets while also protecting their principal investments. Some currently available investment instruments seek to provide similar opportunities for investors. However, these instruments typically have terms that are longer than one year. For example, many banks offer CDs in which interest is indexed to a stock market or other financial index. However, the terms of those CDs are typically three to five years in length. Thus, an investor may not be able to freely change from one investment risk strategy to another at the end of each year (or similar short term period), but must instead wait for the end of the longer term. Investors in CDs who wish to change investments before the end of a term must typically pay a penalty for withdrawing their money. Therefore, a need also exists for an investment instrument that gives investors a choice of participation levels and protects their principal and, in addition, has a relative short term.

Finally, it may be advantageous for an issuer of an investment instrument to clear that instrument through a depository, such as the Depository Trust Company. Typically, instruments that clear through a depository have longer terms and do not give investors the choice of participation levels in financial markets. Thus, a need exists for an instrument that allows investors to choose levels of participation in financial markets, protects the investors' principal, has relatively short terms and/or is cleared through a depository.

SUMMARY OF THE INVENTION

The present invention provides a system and method for creating and administering an investment instrument. More specifically, the present invention provides a system and method for creating and administering an investment instrument that enables investors to choose a level of participation in financial market activity while protecting their principal investments. The present invention also provides for an investment instrument with relatively short terms and/or that is cleared through a depository. In accordance with one embodiment of the invention, an investment instrument preserves an investor's principal and offers a choice of several models for generating return. Return-generating models may allow an investor to participate fully in market movement or participate partially in market movement with a guaranteed minimum return, or receive a fixed return without participating in market movement.

BRIEF DESCRIPTION OF EXEMPLARY DRAWING FIGURES

The invention is illustrated in the figures of the accompanying drawings, which are meant to be exemplary and not limiting, in which like references are intended to refer to like or corresponding components or parts.

DETAILED DESCRIPTION OF EXEMPLARY EMBODIMENTS

Figure 1:
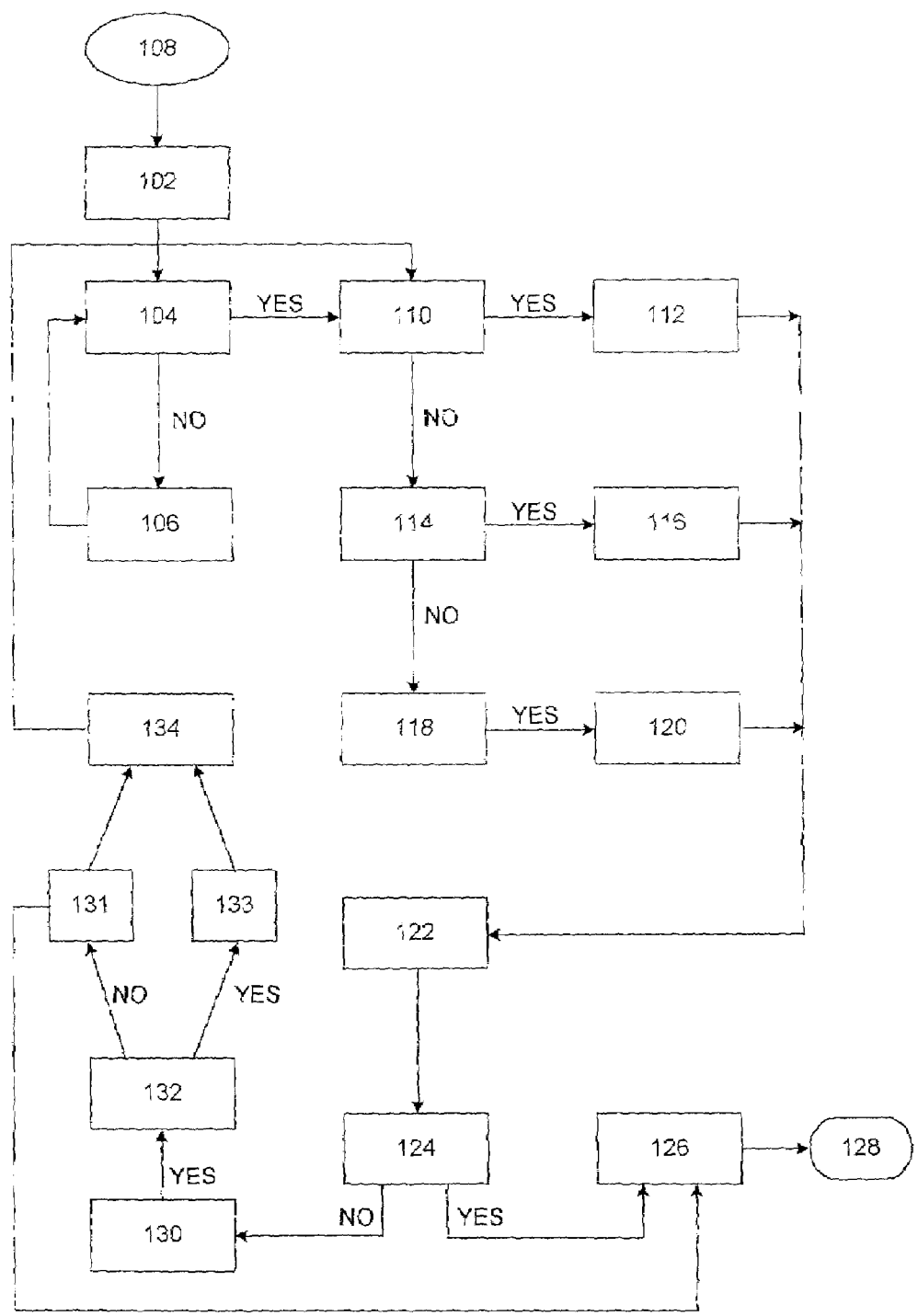
FIG. 1 is a flow diagram, showing an exemplary life of an investment instrument from purchase to maturity.

The following specification describes, in detail, exemplary embodiments of a system and method for enabling investors to participate in financial market activity while preserving or substantially preserving their principal investments. In accordance with one embodiment of the present invention, a method provides for the creation and administration of an investment instrument which preserves investors' principal and offers a choice of return-generating models These return-generating models may include participating fully in market movement, participating partially in market movement with a guaranteed minimum return, receiving a guaranteed return without participating in market movement, or any other configuration that may suitably be provided by the issuer of an investment instrument. In accordance with one embodiment of the present invention, an investment instrument has relatively short terms of, for example, one year (52 weeks) and/or is cleared through a depository, as further described below.

The following description is of exemplary embodiments of the invention only, and is not intended to limit the scope, applicability or configuration of the invention in any way. Rather, the following description is intended to provide convenient illustrations for implementing various embodiments of the invention. As will become apparent, various changes may be made in the function and arrangement of the elements described in these embodiments without departing from the spirit and scope of the invention.

As described briefly above, the present invention provides a system and method for creating and administering an investment instrument. This instrument may take the form of a certificate, an account or any other form for representing an investment instrument. For example, the instrument may be a certificate, printed on paper and describing the value and terms of the instrument. Alternatively, the instrument may be an account or record, recorded in a computerized database of the issuer. It will be understood by those skilled in the art that an investment instrument created and administered according to the present invention may take any form reasonably suited for an investment instrument. An "account number" of the financial account, as used herein, includes any device, code, or other identifier/indicia suitably configured to allow the consumer to interact or communicate with the system, such as, for example, authorization/access code, personal identification number (PIN), Internet code, other identification code, and/or the like which is optionally located on a rewards card, charge card, credit card, debit card, prepaid card, telephone card, smart card, magnetic stripe card, bar code card, and/or the like. The account number may be distributed and stored in any form of plastic, electronic, magnetic, and/or optical device capable of transmitting or downloading data from itself to a second device.

In accordance with one embodiment of the present invention, the instrument is offered for sale to investors by an "issuer." The issuer may be an entity suitable for creating and administering an investment vehicle, such as a credit card company or financial advice company. The issuer may, but need not, be a financial institution, an investment company or a bank. The issuer may offer instruments having face values equal to any amount chosen by the investor or, alternatively, the issuer may offer instruments having fixed denominations within a range of face values. For example, an issuer may allow an investor to purchase one or more certificates, each having a face value of between $100 and $10 million, in increments of $100. Any given issuer may chose to offer an investment instrument for any range of face values, and all ranges are contemplated within the scope of the present invention. As described further below, the issuer may actually sell the investment instrument of the present invention directly to customers, but may also allow a third party seller (or "broker/dealer") to sell the instrument on its behalf.

In accordance with one embodiment of the present invention, the investment instrument has a "term" and a date of "maturity." The term is a period of time starting on a particular day defined by the issuer (the "set date") and ending on a particular day defined by the issuer. For example, an investment instrument may be offered that starts on the first Wednesday of every month and ends on the Tuesday before the 52-week anniversary from the set date. The date of maturity may fall at the end of one or more terms. For example, the date of maturity might occur after ten terms. In accordance with one embodiment of the present invention, an investment instrument may earn "interim interest" from the date of purchase until the set date of the term of the instrument. For example, if an investor purchases an instrument on a Thursday immediately following the first Wednesday of the month, and the issuer has defined the set date for that instrument as occurring on the first Wednesday of each month, then the instrument would earn interim interest from the Thursday purchase date until the first Wednesday of the following month At that point, the term would begin and the instrument would earn interest according to the return-generating model chosen for that instrument.

An issuer may set an interim interest rate within a range of several basis points above or below the average interest rate published for 12-month CD's. For example, an institution may set the interim interest within a range of 15 basis points (0.15%) below to 85 basis points (0.85%) above the average interest rate for a 12-month CD. Issuers may use any number of financial reporting services, such as the Bank Rate Monitor Top 25 Market Average, to calculate the average interest rate for 12-month CDs. Further aspects of the term and date of maturity are discussed below.

As discussed briefly above, the initial amount invested in an investment instrument is called the instrument's "face value." Face value is distinct from "principal," which is the value of the investment instrument at the beginning of each term. Thus, principal consists of the face value plus any value that has accrued to the instrument during prior terms, including interest earned and additional investments made by the customer, less withdrawals, withdrawal penalties, fees or interest distributed to the investor in cash. In accordance with the present invention, the issuer of the investment instrument guarantees or substantially guarantees the principal against losses. For example, assume a customer initially invests $10,000 in an investment instrument according to the present invention ($ 10,000 face value), accumulates interest of 7.25% during the instrument term, and invests an additional $2,500.00 in the certificate. Also, the customer neither takes any interest as cash, nor makes any withdrawals. Table 1 presents the calculated value of the customer's principal at the end of the term based on these facts:

TABLE 1

|       | $10,000 | Face amount or initial investment      |
|-------|---------|----------------------------------------|
| Plus  | $725    | Interest credited to the account       |
| Minus | $(0)    | Interest paid in cash                  |
| Plus  | $2,500  | Additional investment to certificate   |
| Minus | $(0)    | Withdrawals and applicable penalties   |
| Equals| $13,230 | Principal                              |

Since the principal in the above example is now $13,230, that amount is protected against losses by the issuer for the subsequent term.

In accordance with one embodiment of the present invention, an issuer may allow an investor to select a return-generating model for an investment instrument from at least two possible return-generating models. For example, an issuer may offer investment instruments with three possible return models. Such models may allow an investor to fully participate in the activity of a given market, with the full amount of the investment based on the market's activity and with no guaranteed return; to partially participate in a given market's activity, with a percentage of the investment's return based on the market's activity and with a minimum guaranteed interest; or to not participate in any market activity, with a fixed rate of interest. In accordance with one embodiment, an issuer may allow investors to choose any return-generating model at the beginning of the first term of an investment instrument and to change models at the start of each new term. In another embodiment, an issuer may limit investors' choices, for example, offering full or partial participation models only, for several terms, then offering the no participation model for subsequent terms. It will be apparent to one skilled in the art that multiple combinations of offerings are possible.

Under the full participation interest return model, an investor chooses to fully participate in any percentage increase in a specified market index. For example, the Standard & Poor's 500 Composite Stock Price Index ("S&P 500 Index") is one market upon which returns may be based. If an investor chooses the full participation model, the instrument only accrues interest if the value of the S&P 500 Index is higher on the last day of the term than it was on the first day of the term. Likewise, the instrument will earn no interest for the term if the value of the index is lower on the last day of the term than it was on the first day of the term. (Alternatively, interest for a given investment instrument may be calculated by averaging values occurring on multiple days for an index. For example, interest for a given year could be calculated by taking the average value for the S&P 500 Index during the last month of the year and subtracting the average value for the S&P 500 for the first month of the year.) In either case, however, the investor does not lose principal. If interest is earned, the percentage earned is equal to the percentage of increase in the S&P 500 Index.

Another possible return-generating model is that of partial participation with guaranteed, minimum interest. Under this option, the investor earns a rate of return that is less than 100% of any increase in the S&P 500 Index. With partial participation, the investor also earns guaranteed, minimum interest which is not dependent on activity of any market. For example, an issuer may offer investment instruments with partial participation returns of 25% of any increases in the S&P 500 Index plus guaranteed, minimum interest of 2.5%. It will be apparent to one skilled in the art that any combination of return percentages may be used.

Yet another possible return-generating model is that of no market participation, with a guaranteed, fixed interest rate. For the purposes of this specification "guaranteed, minimum interest" means the interest guaranteed to an investor under the partial market participation model, "guaranteed, fixed interest" means the interest guaranteed to an investor under the no market participation model, and "guaranteed interest" means interest generated by either of those two models. Thus, under the no market participation model, an issuer offers an investment instrument with a fixed interest rate that is unaffected by any market activity. In accordance with another embodiment of the present invention, the investment instrument may have a no market participation return model in which the guaranteed interest is tied to a non-fixed, non-market, financial indicator. For example, the rate of return may be tied to the interest rate set by the Federal Reserve.

In accordance with another exemplary embodiment, the issuer of an investment instrument may limit any interest earned by the instrument to a set, "maximum return." The maximum return is the largest amount or percent of return which an investment instrument may earn in any given term, including both participation interest and guaranteed interest. For example, an issuer may set a maximum return at 10% of any increase in the S&P 500 Index. If so, an investor cannot earn more than that amount in total interest over the term, regardless of the return-generating model chosen for the investment instrument.

In another embodiment, an issuer may allow investors to withdraw earned interest from the instrument at any time during a term or only at designated times. The issuer may charge a withdrawal penalty for withdrawals at certain times. Earned interest that is not withdrawn from the instrument becomes part of the principal at the start of the succeeding term. At the end of each term, an issuer calculates interest earned on investment instruments. If an instrument earns guaranteed interest, that interest may accrue daily and may be credited and compounded at the end of the term. According to one embodiment, guaranteed interest is calculated on a 30-day month and 360-day year basis. Interim interest accrues daily and is compounded and credited at the end of the term immediately following the period in which interim interest is earned. Alternatively, interim interest is compounded and credited at the outset of the term following the period in which it is earned and becomes part of the principal.

An investment instrument created and administered according to the present invention reaches maturity after a predetermined number of terms have elapsed. At maturity, the issuer disburses, to the investor, the monetary value of the investment instrument's principal. As discussed above, the principal is the total of all investments (i.e., face value plus additional investments), plus credited interest not paid out in cash, less any withdrawals, withdrawal penalties and transaction fees. The disbursement may be achieved by any method or system suitably configured to transfer funds, such as, for example, physical check, bank wire, gift certificate, account transfer and/or the like.

FIG. 1 is a flow diagram depicting the creation and administration of an investment instrument according to one embodiment of the present invention. It will be recognized by those skilled in the art that the steps described by FIG. 1 are exemplary in nature and some steps may be skipped or the order of steps may be changed without substantially effecting the result of the present invention. In accordance with the present invention, an issuer offers an investment instrument for sale 108. An investor then selects the instrument face value and model of return 102 and purchases the instrument. The issuer determines whether the account has been generated on the set day for instrument terms to start 104. If not, the instrument may accrue interim interest until the set day arrives 106. The issuer also determines if the model of return chosen by the investor 102 is one of no market participation with guaranteed, fixed interest 110. If so, the instrument accrues fixed interest for the duration of the term 112. At the end of each term 122, the issuer credits and compounds interest, including interim interest 122, and determines if the instrument has reached maturity 124. At maturity, the issuer disburses the principal to the investor 126 and the life of the instrument ends 128.

Calculations of interest, return, principal, principal after withdrawals and/or withdrawal fees and other calculations used to administer an investment instrument according to the present invention, may be made by any suitable means for making such calculations. For example, any currently available accounting software, well known to those skilled in the art, may be used. Alternatively, proprietary software of a given issuer of an investment instrument may be used to calculate interest and other monetary amounts related to an investment instrument. Calculations may also be made by hand or by a simple calculator and recorded manually as book entries.

If an investor chooses a model of return 102 not based on guaranteed, fixed interest 110, the issuer determines whether the customer has chosen a return model of partial market participation plus guaranteed, minimum interest 114. If so, the investment instrument accrues partial participation returns plus guaranteed, minimum interest for the duration of the term 116. If an investor chooses a return model of full market participation 118, the investment instrument accrues full participation returns for the duration of the term 116. Again, the issuer credits and compounds interest at the end of each term 122 and determines when the certificate has reached maturity 124. At maturity, the issuer disburses the principal to the investor 126 and the term of the investment instrument ends 128.

An issuer may allow an investor to withdraw interest, principal or both from the instrument. The issuer may request that all withdrawals occur at the end of a term 122 or may allow withdrawals at other times but may charge a withdrawal penalty at those times. At the end of each term 122, but before an investment instrument reaches maturity 124, the issuer may automatically renew an investment instrument for an additional term or may request an investor to renew the instrument 130. If the instrument is not renewed, the issuer disburses the principal to the investor 126. If the instrument is renewed, the investor may have the option of reinvesting earned interest in the instrument or receiving the earned interest as a payment 132. If the instrument is renewed 130 and the investor takes the interest as a payment, the issuer disburses the earned interest to the customer 126 and reinvests an amount equal to principal minus interest 131. Alternatively, the customer may choose to reinvest the entire principal in the new certificate 133. At the maturity of an investment instrument—i.e., when the last term of the instrument is complete—all remaining principal and interest is disbursed 126 and the life of the instrument ends 128. In one embodiment, an investment instrument that reaches maturity cannot be renewed, but instead, a new instrument can be purchased.

At the end of each term of an investment instrument according to one embodiment of the present invention, the issuer may give an investor the option of selecting a new model of return for the instrument 134. Alternatively, the issuer may only allow investors to chose new return models after certain terms or may not permit any changes from the original return model. In one embodiment, if an investor wishes to change return models at the end of a term, a new instrument is issued, rather than changing the terms of the original instrument. Regardless of which return model is chosen for a new term, an investment instrument begins earning interest according to that model from the start of the new term 110.

Figure 2:
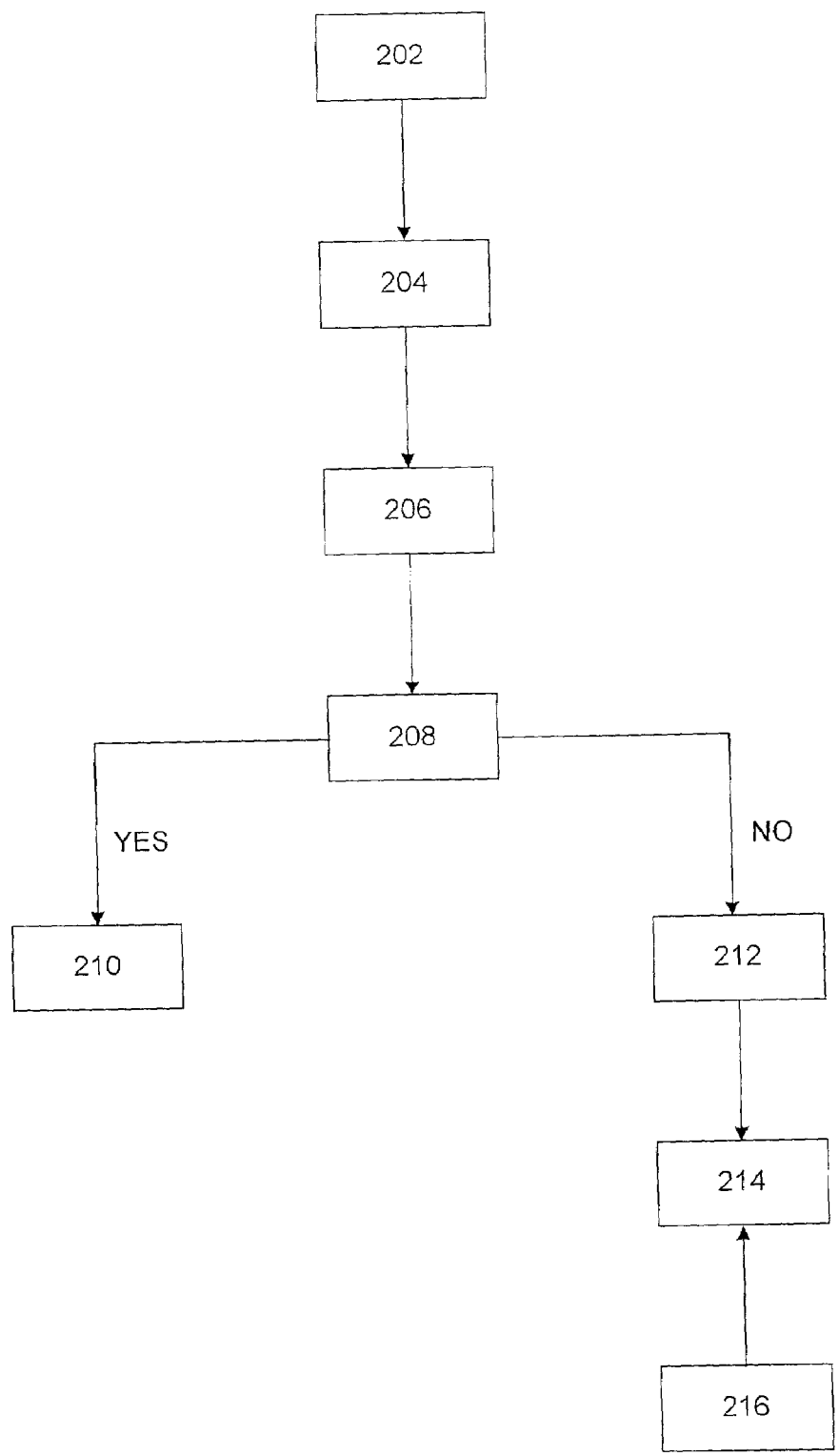
FIG. 2 is a flow diagram, showing an exemplary method for calculating the rate of return of an investment instrument.

FIG. 2 is a flow diagram outlining a method for calculating full and partial participation interest for an investment instrument according to the present invention. It will be recognized by those skilled in the art that the steps described by FIG. 2 are exemplary in nature and some steps may be skipped or the order of steps may be changed without substantially effecting the result of the present invention. In accordance with one embodiment of the present invention, the issuer determines the value of a financial market index, such as the S&P 500 Index, at the start and end of a term of an investment instrument 202. The issuer then subtracts the index value at the start of the term from the index value at the end of the term 204. The issuer then divides the difference between the start and end values 204 by the value of the same financial market index at the start of the term 206. The result of that division 206 equals the rate of return of the given financial market index.

If an investor chooses the full participation return model 208, the rate of return earned by the investment instrument equals the rate of return of the given financial market index, up to the maximum return 210. If, instead, the investor chooses the partial participation return model, the issuer multiplies the rate of return of the given financial market index by the partial participation percentage of the instrument to determine a partial participation return 212. This partial participation return 212 is then added to the guaranteed, minimum interest rate of the instrument 214 and the sum is the total return for that instrument 216.

The following examples demonstrate calculations for an investment instrument, created and administered according to one preferred embodiment of the present invention. For the example presented in Table 2, the market index used is the S&P 500 Index, which has a value of 1,300 at the start of the certificate term and 1,425 at the end of the term. Also for the purposes of the example in Table 2, the guaranteed, minimum interest is 2.5%, and the partial participation percentage is 25%.

TABLE 2

|  | | |
|---|---|---|
|  | 1,425 | S&P 500 Index at end of term |
| minus | 1,300 | S&P 500 Index at start of term |
| equals | 125 | Difference between end and start values |
| divided by | 1,300 | S&P 500 Index at start of term |
| equals | 9.62% | S&P 500 Index percent increase for term |
| times | 25% | Partial participation percentage |
| equals | 2.4% | Partial participation return |
| plus | 2.5% | Guaranteed, minimum interest rate |
| Equals | 4.9% | Total return |

As the table shows, the customer's partial participation return would be 4.9%. If the customer had opted for full participation, the certificate's rate of return would have been 9.62%.

The following scenarios and tables provide similar examples of potential returns on investment instruments created and administered according to several embodiments of the present invention. In these examples, the guaranteed, minimum interest rate on partial participation is 2.5%, the partial participation rate is 25%, and the maximum possible return is capped at 10%.

Scenario 1:

S&P 500 Index value at start of term=1000

S&P 500 Index value at end of term=1080

Increase in S&P 500 Index value=8%

TABLE 3

| Full Participation | Partial Participation |
|---|---|
| Certificate face value = $10,000 | Certificate face value = $10,000 |
| Earned interest = $800 (8% × $10,000) | Minimum interest = $250 (2.5% × $10,000) |
|  | Participation interest = $200 (25% × 8% × $10,000) |
| Certificate value at term end = $10,800 | Certificate value at end of term = $10,450 |

Scenario 2:

S&P 500 Index value at start of term=1000

S&P 500 Index value at end of term=1160

Increase in S&P 500 Index value=16%

TABLE 4

| Full Participation | Partial Participation |
|---|---|
| Certificate face value = $10,000 | Certificate face value = $10,000 |
| Earned interest = $1,000 (10% maximum rate × $10,000) | Minimum interest = $250 (2.5% × $10,000) |
| Certificate value at term end = $11,000 | Participation interest = $200 (25% × 16% × $10,000) |
|  | Certificate value at end of term = $10,650 |

Scenario 3:

S&P 500 Index value at start of term=1000

S&P 500 Index value at end of term=961

Decrease in S&P 500 Index value=4%

TABLE 5

| Full Participation | Partial Participation |
|---|---|
| Certificate face value = $10,000 | Certificate face value = $10,000 |
| Earned interest = $0 | Minimum interest = $250 (2.5% × $10,000) |
| Certificate value at term end = $10,000 | Participation interest = $0 |
|  | Certificate value at end of term = $10,250 |

Figure 3:
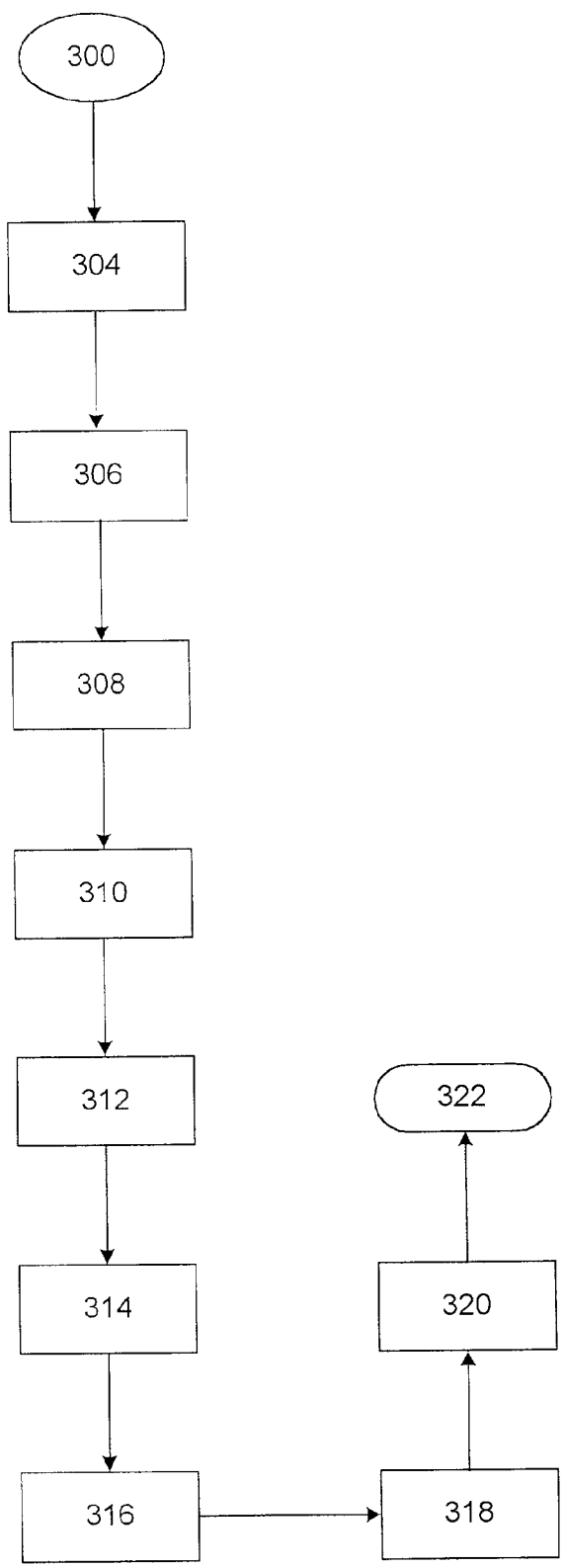
FIG. 3 is a flow diagram, showing the movement of funds upon purchase of, and withdrawal from, an investment instrument.

FIG. 3 is a flow diagram, showing the movement of funds upon purchase of, and withdrawal from, an investment instrument according to one embodiment of the present invention. In this embodiment, a broker/dealer accepts funds from an investor for purchase of an investment instrument 300. Funds may be in the form of currency, check, money order or any other form of payment chosen as acceptable by broker/dealer and/or issuer. Broker/dealer may be any dealer of securities or other investment instruments or any other entity which is chosen by the issuer of the investment instrument to sell the instrument to investors. In one embodiment of the present invention, broker/dealer is a direct or indirect participant in the Depository Trust Company (DTC). Thus, broker/dealer may submit the purchase funds for an investment instrument, minus any commission taken by broker/dealer, to the DTC 304. The DTC accepts the funds and credits the broker/dealer's DTC account in the amount of the funds 306. The DTC then wires funds, equivalent to the purchase price of the investment instruments purchased by the investor, to the issuer 308. On receipt of such funds, the issuer issues an investment instrument, as a book entry in its accounting system, and broker/dealer records an ownership interest of the purchaser of the investment instrument 310. Broker/dealer also sends confirmation of the purchase to the investor/purchaser 312, confirming purchase of the investment instrument and confirming details, such as return model chosen, guaranteed interest rate, if any, and any further pertinent details.

In accordance with one embodiment of the present invention, broker/dealer accepts all requests for withdrawals and transfers of funds from an investment instrument 314. Upon request for withdrawal, for example, broker/dealer informs the DTC and issuer of the request 316. Issuer then transfers funds for the withdrawal to the DTC 318, the DTC disburses equivalent funds to broker/dealer 320 and broker/dealer disburses the funds to the purchaser of the investment instrument 322. Penalties for withdrawals before the end of a term may be applied to a given investment instrument. For example, an investor may be charged a two percent penalty for withdrawing funds from an investment instrument before the end of a term.

In another embodiment of the present invention, the work of the broker/dealer is divided between a selling broker/dealer and a clearing broker/dealer. In that embodiment, seller broker/dealer sells investment instruments directly to purchasers, through a representative, and clearance broker/dealer transfers funds between the DTC and selling broker/dealer. It should be understood that other alternative organizations of sellers, dealers, depository companies, issuers and the like may be used to achieve the same results of the embodiments of an investment instrument as described above.

In order to transfer information, electronic funds and/or for any other purpose, one or more computerized systems may be integrated into the system for creating and administering an investment instrument, according to the present invention. For example, an investment instrument may be offered for sale over the Internet or other network systems. Thus, the system according to the present invention may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, a computer used by an investor to access and use this system may include an operating system (e.g., Windows 95/97/98/2000, Linux, Solaris, etc.) as well as various conventional support software and drivers typically associated with computers. The user's computer can be in a home or business environment with access to a network. In an exemplary embodiment, access is through the Internet through a commercially-available web-browser software package.

The user's computer may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access Sequel Server, Oracle, Mysequel, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XAL), dynamic HTML, cascading style sheets (CSS), helper applications, plug-ins, and the like.

Information stored by a broker/dealer, the DTC, issuer or any other entity involved in the system and method described by the present invention may be stored in a computerized database. Database may be any type of database, such as relational, hierarchical, object-oriented, and/or the like. Common database products that may be used to implement database include DB2 by IBM (White Plains, N.Y.), any of the database products available from Oracle Corporation (Redwood Shores, Calif.), Microsoft Access by Microsoft Corporation (Redmond, Washington), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, eXtensible Markup Language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

It will be appreciated that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, the invention may be implemented with TCP/IP communications protocols, IPX, Appletalk, IP-6, NetBIOS, OSI or any number of existing or future protocols. Moreover, the system contemplates the use, sale or distribution of any goods, services or information over any network having similar functionality described herein.

Any computing units utilized by the system according to one embodiment of the present invention may be connected with each other via a data communication network. The network may be a public network and assumed to be insecure and open to eavesdroppers. In the illustrated implementation, the network may be embodied as the Internet. In this context, the computers may or may not be connected to the Internet at all times. For instance, the user's computer may employ a modem to occasionally connect to the Internet, whereas the issuer's computer system might maintain a permanent connection to the Internet. Specific information related to the protocols, standards, and application software utilized in connection with the Internet may not be discussed herein. For further information regarding such details, see, for example, DILIP NAIK, INTERNET STANDARDS AND PROTOCOLS (1998), JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to network via data links. A variety of conventional communications media and protocols may be used for data links, such as a connection to an Internet Service Provider (ISP) over the local loop as is typically used in connection with standard modem communication, cable modem, Dish networks, ISDN, Digital Subscriber Line (DSL), or various wireless communication methods. Merchant system might also reside within a local area network (LAN) which interfaces to network via a leased line (T1, D3, etc.). Such communication methods are well known in the art, and are covered in a variety of standard texts. See, e.g., Gilbert HELD, UNDERSTANDING DATA COMMUNICATIONS (1996), hereby incorporated by reference.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Communication between the parties to an investment instrument created and administered according to the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A computer-implemented method for enabling investors to participate in a market index and preserve principal, said method comprising:
    offering for sale, via a host computer, an investment instrument, wherein said investment instrument includes a face value, term and date of maturity;
    accepting funds, via said host computer, from a purchaser for said investment instrument;
    allowing, via said host computer, said purchaser of said investment instrument to select a return-generating model for said investment instrument from at least two different return-generating models, at least one of said return-generating models being based on at least one of full and partial investment in a market index;
    calculating, via said host computer, a return earned by said investment instrument at an end of at least one of said term and said date of maturity according to said return-generating model selected by said purchaser;
    adding said return, via said host computer, to said face value of said investment instrument to calculate said principal of said investment instrument;
    guaranteeing said principal against losses; and
    distributing to said purchaser a monetary equivalent of at least one of said principal and said return.

2. The method of claim 1 wherein said offering for sale step is conducted by a party other than an issuer of said investment instrument.

3. The method of claim 1 wherein said accepting funds step is conducted by a party other than an issuer of said investment instrument.

4. The method of claim 1 wherein said funds are deposited with a depository company.

5. The method of claim 4 wherein said depository is the Depository Trust Company.

6. The method of claim 4 wherein said term has a duration of 52 weeks.

7. The method of claim 4 wherein said term has a duration of one calendar year.

8. The method of claim 4 wherein said term has a duration of two calendar years.

9. The method of claim 1 wherein said term has a duration of 52 weeks.

10. The method of claim 1 wherein said term has a duration of one calendar year.

11. The method of claim 1 wherein said term has a duration of two calendar years.

12. The method of claim 1 wherein said face value is determined by an issuer of said investment instrument.

13. The method of claim 1 wherein said face value is chosen by said purchaser of said investment instrument.

14. The method of claim 1 wherein said date of maturity occurs after 10 of said terms.

15. The method of claim 1 wherein said return-generating model may be selected from a group comprising a fixed rate of return, a rate of return based on partial participation in a market index and a rate of return based on full participation in a market index.

16. The method of claim 15 wherein said rate of return based on partial participation in a market index also includes a guaranteed, minimum interest.

17. The method of claim 1 wherein said investment instrument accrues interim interest from the date of purchase until the first day of said term.

18. The method of claim 1 wherein calculating said return and said principal is performed at the end of each said term.

19. The method of claim 1 wherein calculating said return and said principal is performed by a computer system including accounting software.

20. The method of claim 1 wherein calculating said return and said principal is performed daily.

21. The method of claim 1 wherein said distributing at least one of said principal, said return is performed at the end of said term.

22. The method of claim 1 wherein said distributing at least one of said principal, said return is performed upon request of said purchaser.

23. A system configured to enable investors to participate in a market index and preserve principal, said system comprising:
   a module configured for offering for sale an investment instrument, wherein said investment instrument includes a face value, term and date of maturity;
   a module configured for accepting purchase funds from a purchaser of said investment instrument;
   at least two return-generating models for said investment instrument configured to allow said purchaser to chose at least one of said return-generating models, at least one of said return-generating models being based on at least one of full and partial investment in a market index;
   a first module configured for calculating a return earned by said investment instrument at an end of at least one of said term and said date of maturity according to said return-generating model selected by said purchaser;
   a second module configured for calculating said principal of said investment instrument by adding said return to said face value;
   a module configured for guaranteeing said principal against losses; and
   a module configured for distributing to said purchaser a monetary equivalent of at least one of said principal, and said return at said end of at least one of said term and said date of maturity.

24. The system of claim 23 wherein said module configured for offering said investment instrument for sale comprises an issuer and a seller.

25. The system of claim 24 wherein said issuer and said seller are different entities.

26. The system of claim 24 wherein said issuer and said seller are the same entity.

27. The system of claim 23 wherein said face value is determined by an issuer of said investment instrument.

28. The system of claim 23 wherein said face value is chosen by said purchaser.

29. The system of claim 23 wherein said module configured for accepting purchase funds includes a depository company.

30. The system of claim 29 wherein said depository company is the Depository Trust Company.

31. The system of claim 29 wherein said term has a duration of 52 weeks.

32. The system of claim 29 wherein said term has a duration of one calendar year.

33. The system of claim 29 wherein said term has a duration of two calendar years.

34. The system of claim 23 wherein said term has a duration of 52 weeks.

35. The system of claim 23 wherein said term has a duration of one calendar year.

36. The system of claim 23 wherein said term has a duration of two calendar years.

37. The system of claim 23 wherein said date of maturity occurs after 10 of said terms.

38. The system of claim 23 wherein said return-generating model may be selected from a group comprising a fixed rate of return, a rate of return based on partial participation in a market index and a rate of return based on full participation in a market index.

39. The system of claim 38 wherein said rate of return based on partial participation in a market index also includes a guaranteed, minimum interest.

40. The system of claim 23 wherein said investment instrument accrues interim interest from the date of purchase until the first day of said term.

41. The system of claim 23 wherein said first module and said second module for calculating is configured for calculating said return and said principal at the end of each said term.

42. The system of claim 23 wherein said first module and said second module for calculating is configured for calculating said return and said principal daily.

43. The system of claim 23 wherein said module configured for distributing is configured for distributing at least one of said principal, and said return at the end of said term.

44. The system of claim 23 wherein said module configured for distributing is configured for distributing at least one of said principal, and said return upon request of said purchaser.

45. A computer-implemented method of investing, in which the investor participates in a market index while protecting principal, comprising:
   purchasing, via a host computer, an investment instrument, wherein said investment instrument includes a certain face value, term and date of maturity;
   selecting, via said host computer, a return-generating model for said investment instrument from at least two different return-generating models, at least one of said return-generating models being based on at least one of full and partial investment in a market index;
   earning interest on said investment instrument in accordance with said return-generating model; and
   receiving the monetary equivalent of said face value and said interest at the end of at least one of said term and said date of maturity.

46. The method of claim 45, further comprising the step of withdrawing at least a portion of at least one of said face value and said interest at any time during said term.

47. The method of claim 45, further comprising the step of paying a withdrawal penalty for withdrawing at least a portion of at least one of said face value and said interest at any time before the end of said term.

48. The method of claim 45, in which said receiving step further involves receiving the monetary equivalent of said face value and said interest at the end of said term, minus the amount of any withdrawals and withdrawal penalties.

49. The method of claim 45, wherein said purchasing step may be accomplished by at least one of deposit of cash, check and money order with a seller of said investment instrument.

50. The method of claim 49 wherein said seller is a different entity from an issuer of said investment instrument.

51. The method of claim 45 wherein said seller is also an issuer of said investment interest.

52. The method of claim 45, wherein said return-generating model is based on full participation in the return of a financial market, with no guaranteed return.

53. The method of claim 45, wherein said return-generating model is based on partial participation in the return of a financial market, with a specified amount of guaranteed return.

54. A computer-implemented method for enabling investors to participate in a market index and preserve principal, said method comprising:
  offering for sale, via a host computer, an investment instrument, wherein said investment instrument includes a face value, term and date of maturity;
  allowing, via said host computer, a purchaser of said investment instrument to select a return-generating model for said investment instrument from at least two different return-generating models, at least one of said return-generating models being based on at least one of full and partial investment in a market index;
  accepting, via said host computer, from said purchaser, a purchase order and purchase funds for said investment instrument;
  issuing, via said host computer, said investment instrument in a name of said purchaser upon receipt of said purchase order and said purchase funds;
  calculating, via said host computer, a return earned by said investment instrument at an end of at least one of said term and said date of maturity according to said return-generating model selected by said purchaser;
  adding, via said host computer, said return to said face value of said investment instrument to calculate said principal of said investment instrument;
  guaranteeing said principal against losses; and
  distributing the monetary equivalent of at least one of said principal and said return to said purchaser at the end of said term.

55. The method of claim 54 wherein at least one of said offering, accepting and distributing steps are performed by a seller of said investment instrument and at least one of said issuing, calculating, adding and guaranteeing steps are performed by an issuer of said investment instrument.

56. The method of claim 55 wherein said seller is a different entity from said issuer.

57. The method of claim 55 wherein said seller and said issuer are the same entity.

58. The method of claim 54, further comprising the step of clearing said purchase funds through a depository company.

59. The method of claim 58 wherein said depository company is the Depository Trust Company.

60. The method of claim 58 wherein said term has a duration of 52 weeks.

61. The method of claim 58 wherein said term has a duration of one calendar year.

62. The method of claim 58 wherein said term has a duration of two calendar years.

63. The method of claim 54 wherein said term has a duration of 52 weeks.

64. The method of claim 54 wherein said term has a duration of one calendar year.

65. The method of claim 54 wherein said term has a duration of two calendar years.

66. The method of claim 54 wherein said face value is determined by an issuer of said investment instrument.

67. The method of claim 54 wherein said face value is chosen by said purchaser.

68. The method of claim 54 wherein said date of maturity occurs after 10 of said terms.

69. The method of claim 54 wherein said return-generating model may be selected from a group comprising a fixed rate of return, a rate of return based on partial participation in a market index and a rate of return based on full participation in a market index.

70. The method of claim 69 wherein said rate of return based on partial participation in a market index also includes a guaranteed, minimum interest.

71. The method of claim 54 wherein said investment instrument accrues interim interest from the date of purchase until the first day of said term.

72. The method of claim 54 wherein calculating said return and said principal is performed at the end of each said term.

73. The method of claim 54 wherein calculating said return and said principal is performed by a computer system including accounting software.

74. The method of claim 54 wherein calculating said return and said principal is performed daily.

75. The method of claim 54 wherein said distributing of at least one of said principal, and said return is performed at the end of said term.

76. The method of claim 54 wherein said distributing of at least one of said principal, and said return is performed upon request of said purchaser.

* * * * *